Nov. 28, 1967 D. R. JOHNSON ET AL 3,355,119

CAPSTAN AND WIND DRIVE AND ACTIVATION MECHANISM THEREFOR

Filed June 23, 1965 4 Sheets-Sheet 1

DELMAR R. JOHNSON
RICHARD A. HATHAWAY
INVENTORS

BY Anderson, Luedeka, Fitch, Even & Tabin
ATTORNEYS

DELMAR R. JOHNSON
RICHARD A. HATHAWAY
INVENTORS

BY Anderson, Luedeka, Fitch, Even & Tabin
ATTORNEYS

DELMAR R. JOHNSON
RICHARD A. HATHAWAY
INVENTORS

BY Anderson, Luedeka, Fitch, Even & Tabin
ATTORNEYS

DELMAR R. JOHNSON
RICHARD A. HATHAWAY
INVENTORS

BY Anderson, Luedeka, Fitch, Even & Tabin
ATTORNEYS 3,355,119
Patented Nov. 28, 1967

3,355,119

CAPSTAN AND WIND DRIVE AND ACTIVATION MECHANISM THEREFOR

Delmar Ronald Johnson and Richard Allen Hathaway, Des Plaines, Ill., assignors to Ampex Corporation, Redwood City, Calif., a corporation of California Filed June 23, 1965, Ser. No. 466,254
11 Claims. (Cl. 242—55.12)

ABSTRACT OF THE DISCLOSURE

This invention is directed to a tape transport which includes a scanning assembly and drive system. The transport further includes rotatable take-up and supply reel supports each of which is selectively coupled to a driving motor as determined by a control means. Brake means are associated with each of the reels for selective braking thereof. The apparatus includes a rotary capstan which is selectively coupled to a drive motor as determined by a second control means. Positioned at locations about the scanning assembly are movable tape guides positionable into thread and operate positions to facilitate threading the tape through the transport. Various linkage means are provided between the first and second controls to allow threading of the tape and movement thereof through the transport.

This invention relates to tape transports for magnetic recording and/or reproducing apparatus, and more particularly to a drive system for such a tape transport.

A tape transport for use in magnetic tape recording and/or reproducing apparatus generally includes a pair of rotatable supports or turntables for the supply and takeup reels which store the magnetic tape. The tape is guided between the supply and takeup reels by an arrangement of guides and over a scanning asesmbly. A rotating capstan operates to drive the tape at a predetermined speed between the supply and takeup reels. The scanning assembly generally includes one or more transducing heads which operate to translate electrical signals to magnetic variations for storage on the tape during the record operation, or which operate to translate magnetic signals stored on the tape into electrical signals during the reproduce operation.

Controls are generally provided on the transport for operating the various elements of the transport according to the desired mode. These controls may include one or more controls for regulating the tension of the tape, a control for moving the tape from the supply reel to the takeup reel at a fast forward speed to move the tape rapidly to a desired position along its length and a control for rewinding the tape from the takeup reel back onto the supply reel. The provision of such controls, while at the same time maintaining quality construction, often results in a costly and complex transport. These difficulties are compounded in the case of apparatus for recording and/or reproducing wide signal bands such as is necessary for recording and reproducing video signals. Where it is desired that the apparatus be portable and capable of withstanding hard use, constructional considerations may make the apparatus still more costly.

It is an object of this invention to provide an improved tape transport of quality construction and which is low in cost.

Another object of the invention is to provide a tape transport having a drive system which is simple of construction and convenient to operate.

Still another object of the invention is to provide a tape transport having a drive system which is reliable in operation and of rugged construction.

In accordance wih the invention, a tape transport having a supply reel support, a takeup reel support, and a capstan is provided with an improved drive system for selectively operating the tape transport in an off mode, a transduce mode for playing or recording, a fast forward mode and a rewind mode. A supply reel drive is operable between first and second positions for coupling and uncoupling, respectively, a supply reel support and a drive motor. A takeup reel drive is operable between first and second positions for coupling and uncoupling, respectively, a takeup reel support and the drive motor. A first control is provided to be operable selectively to an off position, a fast forward position, and a rewind position. Respective linkages couple the first control to the drives and function to operate the respective drives between their first and second positions for off, fast forward, and rewind modes of operation. A capstan drive motor operates a capstan and is coupled to the capstan in response to operation of a capstan drive operable by a second control. The second control also functions at the same time to operate the takeup reel drive to the first position thereof.

The capstan is preferably comprised of a single metal drive shaft upon which is secured a metal cylinder. The outer surface of the metal cylinder is coated with a neoprene rubber which has a hardness of the order of 70 durometer.

In addition to the linkages for controlling the drives, further linkages are provided for controlling a backup preventing brake on the takeup reel support and for controlling a tape tension sustaining brake on the supply reel support. The former prevents the supply reel from backing up to cause tape tangling when the apparatus is off, and is effectively released during other modes of operation. The tension sustaining brake on the supply reel support provides a resistance to rotation of the supply reel to maintain tape tension during transduce mode. It is released during fast forward and rewind modes. These further linkages are operable by the first control and serve to release the brake on the takeup reel support during the rewind and transduce modes of operation and to release the brake on the supply reel support during fast forward mode and rewind modes. When the tension sustaining brake on the supply reel is released, allowing the tape to be readily withdrawn from the supply reel, the linkages operated by the first control provide detent positioning of the first control in an off mode position, a fast forward mode position, and a rewind mode position.

Guides are provided on the transport and are movable by a guide control to a thread position to facilitate threading of tape through the guides. A locking structure is engaged with the guide control in fast forward and rewind mode positions of the first control to prevent the guide control from being operated to move the guides to the thread position while the apparatus is operating in the fast forward or rewind modes. A switch prevents the apparatus from operating in the transduce mode while the guides are in the thread position. A link couples the guide control to the brake on the takeup reel support to momentarily release the brake as the guides are moved into the operating position. This permits the takeup reel to back up and supply any slack in the tape needed to prevent the tape from resisting movement of the guides. The locking structure is also engageable with the first control to prevent operation thereof from the off mode position to the fast forward or reverse positions when the guide control is in the thread position. A switch is provided for disabling the second control when the first control is in the fast forward mode or rewind mode positions.

Other objects and features of the invention will be apparent from the following description taken in connection with the accompanying drawings wherein.

Figure 1:
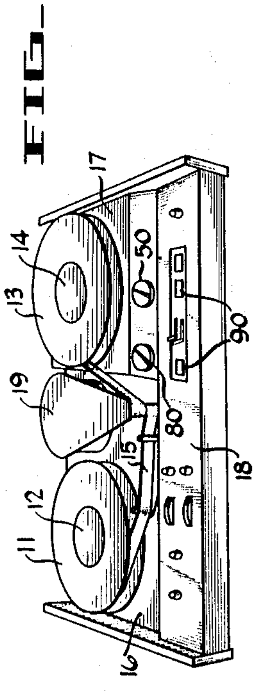
FIGURE 1 is a perspective view, on a reduced scale, of magnetic tape recording and reproducing apparatus having a tape transport incorporating the invention.

Referring now to FIGURE 1, magnetic tape recording and reproducing apparatus incorporating the invention is shown in perspective view. The apparatus includes a supply reel 11 carried on a supply reel turntable 12 and a takeup reel 13 carried on a takeup reel turntable 14. Magnetic tape 15 passes from the supply reel 11 to the takeup reel 13 over various guides, a scanning assembly, and a driving capstan, all of which are shown in the subsequent figures and are described in detail below. The tape deck upon which these latter items are mounted is covered by a panel or escutcheon 16 with suitable openings therein. A further panel 19 covers the guide, capstan and scanning assembly. Takeup reel 13 is mounted on a raised structure 17 to be disposed in a plane parallel to but above the plane of supply reel 11 for purposes to be subsequently described. The front of the apparatus includes a control panel 18 upon which are disposed a plurality of suitable controls and indicators for operating the apparatus.

Figure 2:
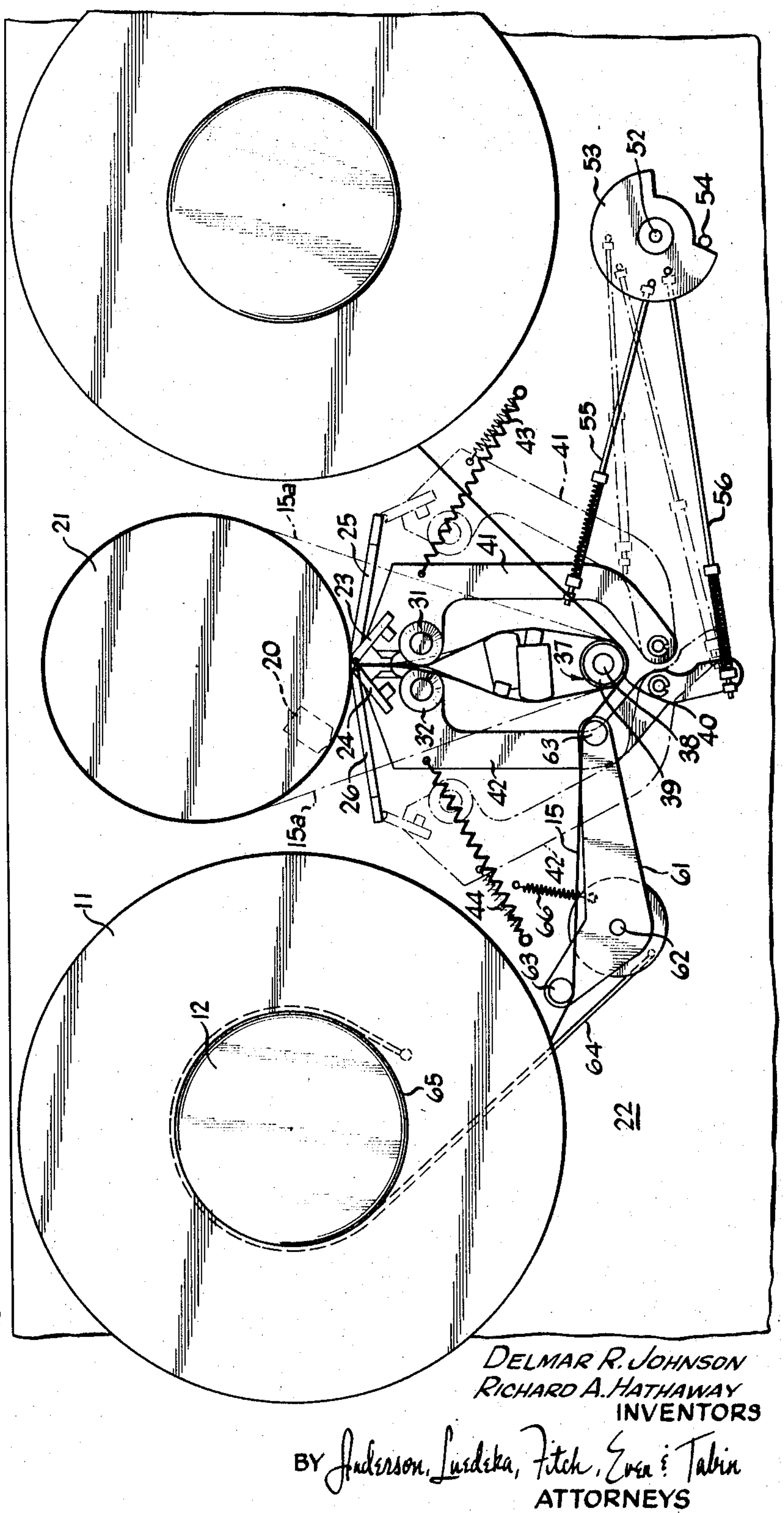
FIGURE 2 is an enlarged top plan view of the tape transport of the apparatus of FIGURE 1.

The apparatus shown in the drawings is for the recording and reproducing of wide band signals such as video signals. A helical wrap scanning assembly 21 is mounted on deck 22 as illustrated in FIGURE 2. FIGURE 2 shows the tape transport as it appears with panel 16 removed and with the further cover panel 19, which covers the guides and scanning assembly, also removed. Scanning assembly 21 contains a movable transducing head 20 which projects a slight distance from scanning assembly 21 and contacts the tape as it rotates about the periphery of scanning assembly 21 in a direction opposite to the tape travel. The scanning assembly 21 is called a helical wrap scanning assembly because, as the tape passes approximately 360° around the periphery of the scanning assembly 21, it describes a helical path. The supply and takeup reels are on different levels to accommodate this helical wrap.

In order for the tape to follow a helical path and extend close to 360° around the periphery of scanning assembly 21 in an omega type wrap, a guide system is provided The guide system includes an entry guide 23 and an exit guide 24. Each of guides 23 and 24 is disposed to direct the tape entering upon and leaving the periphery of scanning assembly 21. In order to assure that the tape will be guided onto the scanning assembly 21 at correct height and taken off at correct height, fixed lower edge guides 25 and 26 are provided. The entrance and exit guides 23 and 24 extend over the top of the fixed edge guides 25 and 26.

In order to effect a helical path in the tape between the level of the supply reel 11 and the level of the takeup reel 13, it is necessary that the tape be twisted before entering upon scanning assembly 21 and twisted again after leaving scanning assembly 21. This is accomplished by means of entry guide cone 31 and exit guide cone 32. Cones 31 and 32 are disposed adjacent to the entry and exit guides 23 and 24. Tape approaching the scanning assembly 21 on the level of supply reel 11 is given a slight twist by cone 31 in order that it rise helically about the periphery of scanning assembly 21. To prevent the tape from continuing to rise after leaving scanning assembly 21, exit cone 32 twists the tape again in order to return it to a path substantially parallel with the plane of deck 22. In both approaching and leaving scanning assembly 21, the tape passes between cones 31 and 32.

For accurate recording and reproduction, it is necessary that the tape move over the scanning assembly 21 in a constant and regular manner. In order to provide such constant and smooth driving of the tape, the driving capstan 37 is positioned to engage and drive the tape prior to its entry upon scanning assembly 21 and subsequent to its exit from scanning assembly 21. Capstan 37 is made long enough for at least two widths of the tape 15 to accomplish such driving contact. Capstan 37 is comprised of a driving shaft 38 upon which is mounted a metallic sleeve 39. A coating 40 of neoprene rubber is molded upon the outside of sleeve 39 and is machined to the desired smoothness and diameter. The neoprene has a hardness of a durometer of the order of 70. The rubber coating 40 is relatively thin. This provides good dimensional stability since the metal sleeve 39 and shaft 38 are not as subject to dimensional changes with temperature as is the rubber. The use of a metal sleeve makes it unnecessary to provide a large driving shaft which would, in turn, necessitate larger and more expensive bearings.

The angle of wrap of tape 15 about the capstan 37 is such as to cooperate with the tape tension and the coefficient of friction to permit driving of the tape by the capstan without slippage, making it unnecessary to utilize pinch rollers or other similar means for holding tape 15 against the outer surface of the capstan 37. When the capstan is operating to drive the tape for recording or playback, the tape passes from the supply reel around the capstan, through the guides, around scanning assembly 21 and back through the guides to pass once more around capstan 37. The capstan is rotatable in the same direction as the direction of tape travel and is positioned with respect to the guide system and scanning assembly such that the tape is wrapped in a loop around the scanning assembly and the capstan. This loop need not necessarily be a single loop as shown, but might take other configurations such as, for example, a figure 8 with each loop of the eight around a respective one of the capstan and scanning assembly.

To provide a substantially 360° omega type helical wrap of tape about scanning assembly 21, it is necessary that entry and exit guides 23 and 24 be disposed close to each other and to the periphery of scanning assembly 21. This is so that the dropout or loss of signal occasioned by that portion of the 360° wrap which is not completed is minimized. The close spacing of guides 23 and 24 and the scanning assembly 21 would make threading of the tape upon the transport difficult for a person using the apparatus. To alleviate this problem, guides 23 and 24 and guide cones 31 and 32 are mounted on a pair of arms 41 and 42 near the ends thereof proximate scanning assembly 21. Arms 41 and 42 are pivotally mounted to the deck 22 and are biased away from each other by springs 43 and 44. Each of arms 41 and 42 is connected, respectively, by means of spring loaded rods 55 and 56 to a disc 53 which is keyed upon a shaft 52 journaled in the deck 22. Shaft 52 may be rotated by a knob 50 (see FIGURE 1) to move the arms between thread and operating positions by rotating disc 53. A stop post 54 extends upwardly from the deck into a cut-out portion of disc 53 to limit the angular displacement of the disc. The arrangement of spring loaded rods 55 and 56 and stop 54 for engaging the disc provides over-center action for pivoting the arms from the operating position shown in solid lines in FIGURE 2 to the thread position in phantom in FIGURE 2. It may be observed that in the thread position of the arms, guides 23 and 24 and cones 31 and 32 are moved away from each other and the scanning assembly 21 to a position outside of a pair of tangent lines drawn between the capstan 57 and scanning assembly 21. These tangent lines coincide with the tape path 15*a* during threading and thus it is sufficient to thread the tape around the capstan and scanning assembly in a loop as shown by the phantom lines 15*a* in FIGURE 2. The movable guide system shown in FIGURE 2 is described and claimed in detail in the copending application Ser. No. 466,378 filed simultaneously herewith.

In order to maintain proper tension on the tape between the supply reel and the capstan, a tape tension servo brake is provided. The tape tension servo brake is comprised of a lever 61 which is secured on a pivot shaft 62 journaled in the tape deck 22. A pair of tape guides 63 are mounted on lever 61 for engaging the tape and imparting moments to lever 61 in accordance with the tension forces on the tape. Lever 61 is also secured to a brake band 64 which extends around a brake drum 65 on the supply reel turntable. The portion of the supply reel turntable which extends into the supply reel 11 is shown in FIGURE 2 to be the same diameter as the brake drum about which the brake band 64 extends. A spring 66 is secured to lever 61 to impart a reference bias thereto. Tension forces on the tape are translated by the guides and lever arrangement to vary the tension applied to the brake band and thus regulate the tape tension by regulating the resistance to rotation of supply reel 11 effected by the brake band 64 and brake drum 65.

Figure 3:
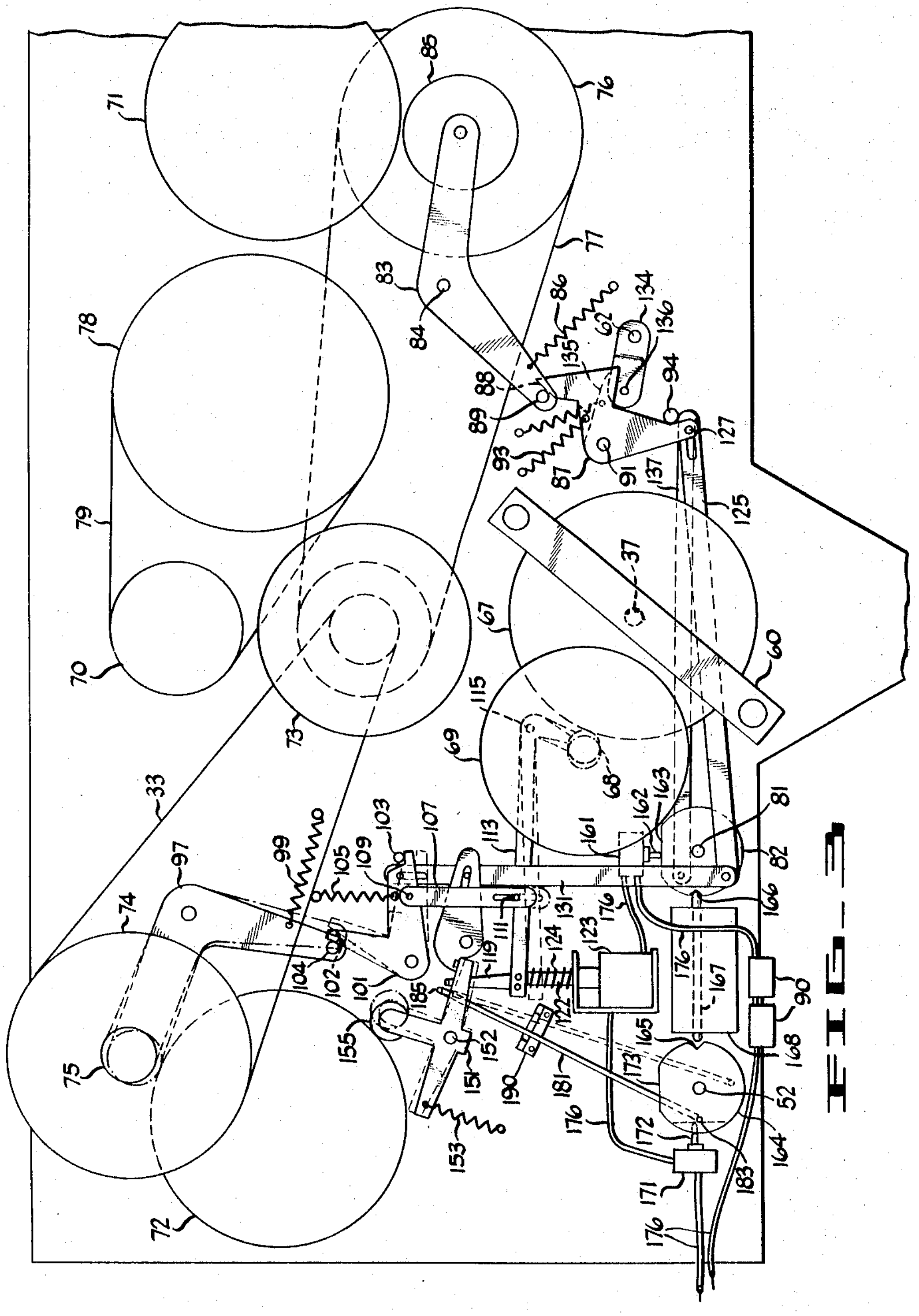
FIGURE 3 is a bottom plan view of the tape transport of FIGURE 2 illustrating the elements positioned for operation in the off mode, and wherein the positions of the elements in the transduce mode are shown in phantom, as is the momentary release position of the takeup reel brake.
Figure 4:
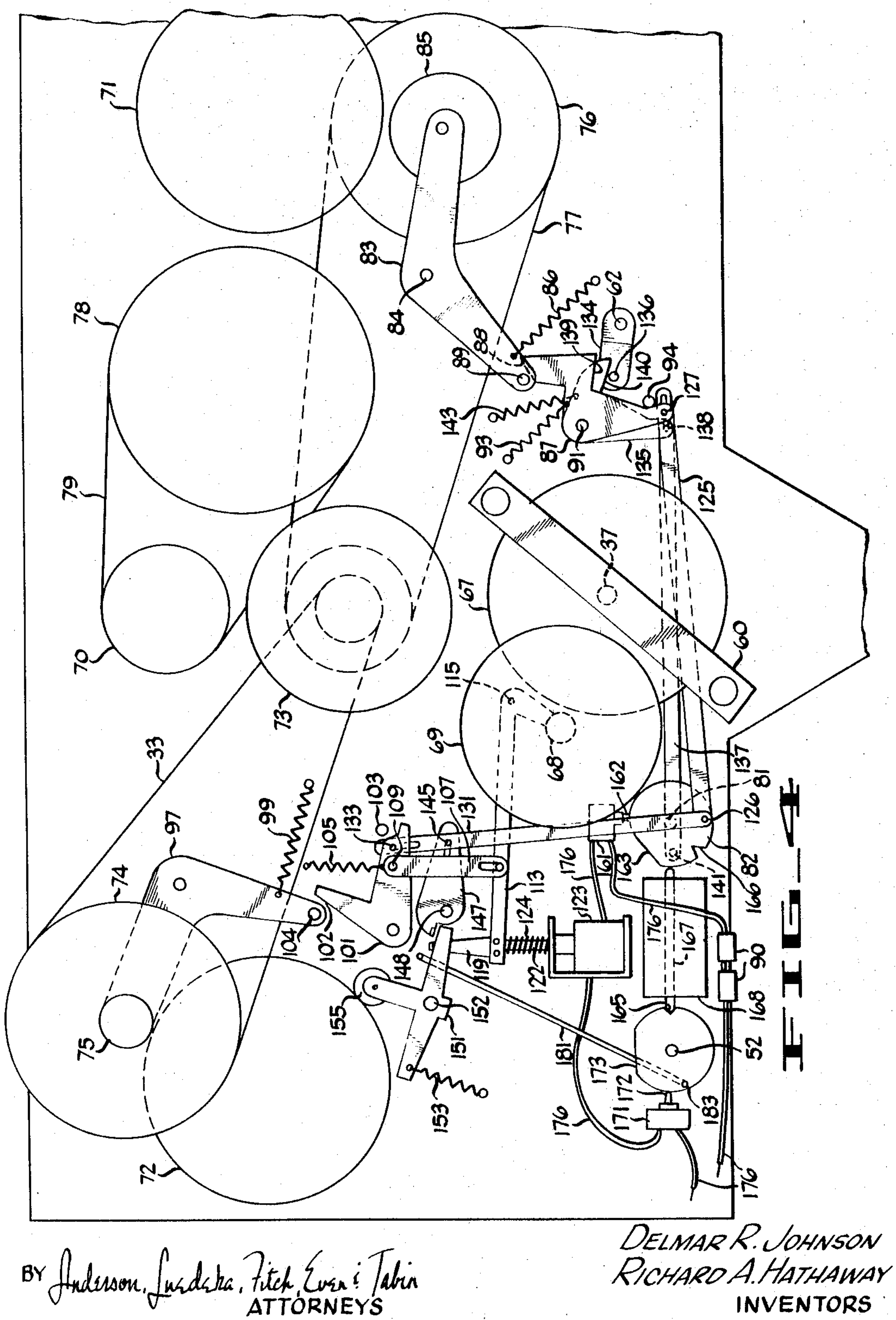
FIGURE 4 is a bottom plan view of the tape transport of FIGURE 2 illustrating the elements positioned for operation in the fast forward mode.
Figure 5:
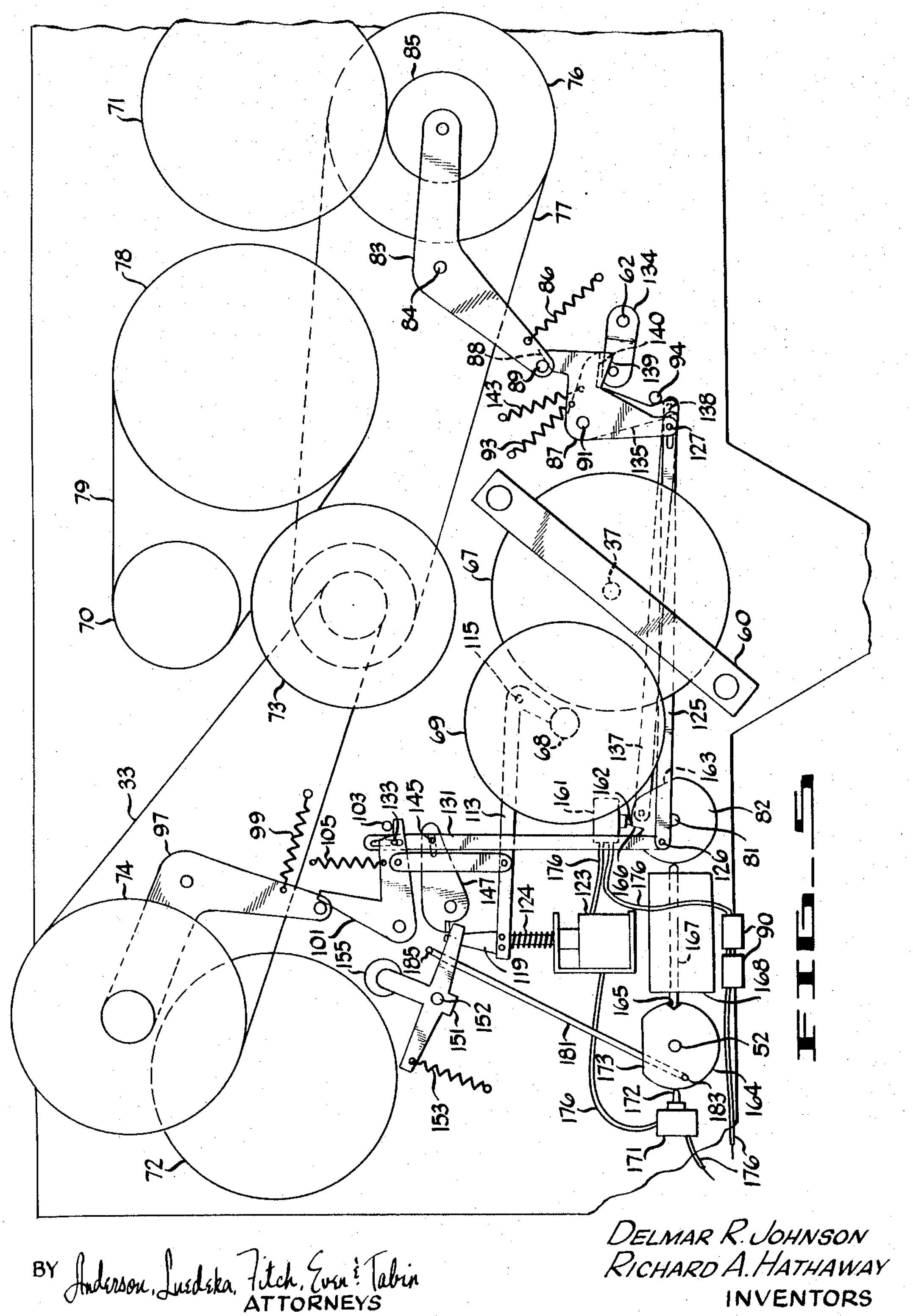
FIGURE 5 is a bottom plan view of the tape transport of FIGURE 2 illustrating the elements positioned for operation in the rewind mode.

Referring now to FIGURES 3–5, the underside of the tape transport is shown. The capstan 37 is journaled in deck 22 and a bracket 60 provides thrust bearing support. Capstan 37 includes a drive wheel 67 on the underside of deck 22. A motor 69 and a drive roller 68 are provided for driving the capstan. The supply reel turntable, which is journaled in deck 22, includes a drive wheel 71 on the underside of the deck 22. Similarly, a drive wheel 72 for the takeup reel turntable is disposed on the underside of deck 22. A turntable drive motor 73 drives a takeup reel drive pulley 74 through a drive belt 33, and also drives a supply reel drive pulley 76 through a belt 77. A transducing head drive motor 78 drives the scanning assembly drive wheel 70 through a drive belt 79.

The function knob 80 (see FIGURE 1), is keyed to a shaft 81 which is journaled in deck 22 and serves to selectively rotate a disc 82 on the underside of deck 22 to an off mode position, a fast forward mode position, and a rewind mode position. In the fast forward mode, the takeup reel rotates at relatively high speed to withdraw tape through the guides and over the scanning assembly from the supply reel. In the rewind mode, the supply reel rotates at relatively high speed in a direction reversed from its normal rotation to withdraw tape through the guides and over the scanning assembly from the takeup reel. In both fast forward mode and rewind mode, the capstan is not motor driven. In the off mode, although the supply and takeup reel turntables and the capstan do not rotate, all the motors are operating.

With the function control disc 82 in the off mode position, and with the motors 73, 69 and 78 operating, the transport may be changed between the off mode and the transduce mode by means of either of switches 90 on the control panel. In the transduce mode, the capstan is motor driven to withdraw tape from the supply reel, the tape being held back by the resistance of the servo brake to maintain tension in the tape. Tension in brake band 64 of the servo brake is maintained by the spring 66. Also, during the transduce mode, the takeup reel is rotationally driven by motor 73 to take up the tape as it leaves the capstan. In the transduce mode, the scanning assembly 21 operates to record or reproduce information on the tape. The head 20 of scanning assembly 21 rotates during all modes of operation. This speed is relatively high, for example, 3600 r.p.m., and as a result, a cushion of air is maintained between the tape and the periphery of the scanning assembly to air lubricate the tape and permit it to pass freely about the scanning assembly.

The various mechanism and linkages for accomplishing the foregoing operations will now be described in connection with FIGURE 3. The elements as shown in solid lines in FIGURE 3 represent the tape transport in the off mode. In the off mode of operation, although the various motors are operating, the supply reel, takeup reel and capstan do not rotate. Supply reel drive pulley 76 is pivotally secured to a member 83 which is pivotal upon a pin 84 mounted in deck 22. The bias of a spring 86 connected to member 83 biases the roller 85 which rotates with pulley 76 toward engagement with turntable drive wheel 71. In the off mode, however, a pivotal member 87 has a portion 88 which engages a stud 89 on member 83 to hold the member 83 against the bias of the spring 86 and thus hold the roller 85 disengaged from the wheel 71. Accordingly, the supply reel is not motor driven. Member 87 is pivotally secured to a pin 91 mounted in deck 22 and is biased in a counterclockwise direction by a spring 93 against a stop 94 rigidly mounted on the deck 22.

Takeup reel drive pulley 74 is secured to an L-shaped member 97. A spring 99, which is attached to member 97 biases roller 75 of pulley 74 toward engagement with drive wheel 72. A further L-shaped member 101 has a portion 102 which is biased into engagement with a stud 104 on L-shaped member 97 by a spring 105. Spring 105 is of sufficient strength to bias member 101 against a stop 103 to maintain roller 75 in the off mode position shown in solid lines in FIGURE 3 disengaged from wheel 72 so that the takeup reel is not motor driven. A link 107, pivotally mounted on a stud 109 to member 101, is slidably and pivotally secured to a stud 111 on a pivotal member 113. The slidable nature of this latter connection enables the member 101 to pivot against the bias of spring 105 independently of the pivotal member 113 for reasons to be explained subsequently. Member 113 is pivotally secured to pin 115 on deck 22 and carries the capstan drive roller 68 and the capstan drive motor 69. Roller 68 is held out of engagement with the capstan drive wheel 67 due to the bias of a spring 124 exerting an upward push on member 113. Spring 124 is mounted on the plunger 122 of a solenoid 123. Spring 105 aids spring 124 through link 107 in exerting an upward push on member 113.

The apparatus may be changed from the off mode to the transduce mode for recording or playback by operating either of switches 90. In the transduce mode, the takeup reel and the capstan are motor driven and tape is withdrawn from the supply reel and passed through the guides and around the scanning assembly. When either of the switches 90 on the control panel are operated to the transduce mode position the solenoid 123 is energized. Energization of solenoid 123 causes plunger 122 to pull the longer arm of member 113 downward to rotate the member 113 about pin 115 in a counterclockwise fashion against the bias of spring 124 and 105. This brings the capstan drive pulley 68 into engagement with the capstan drive wheel 67 as shown by the phantom lines in FIGURE 3, to rotate the capstan. Counterclockwise rotation of member 113 serves to pull member 107 downward and rotate member 101 clockwise against the bias of spring 105 to the position shown in phantom. This permits spring 99 to pivot member 97 in a counterclockwise direction to bring roller 75 into engagement with the drive wheel 72 to override the off position of control 80 for rotating the takeup reel turntable.

A finger 119 extends from member 113 and hooks over one arm of a brake pivot member 151. Member 151 is pivotally mounted to deck 22 by pin 152. The brake roller pivot member 151 is biased by a spring 153 in such a manner as to hold a brake 155 against the periphery of the takeup reel drive wheel 72. When the takeup reel drive wheel 72 is rotated by drive roller 75, the brake 155 presents a minimal resistance to such rotation because the only force holding the brake engaged with the wheel is the relatively small bias of spring 153. The brake, however, prevents backup of the reel 72 when drive roller 75 is removed or stopped because the friction forces on brake 155 tend to wedge it and member 153 between the fixed periphery of wheel 72 and the fixed pivot of pin 152. This braking action prevents tangling of the tape and the throwing of tape loops. Finger 119 pivots member 151 when member 113 is pivoted by solenoid 123 so that brake 155 is disengaged during the transduce mode. This helps to reduce wear on the periphery of drive wheel 72. Thus, energization of solenoid 123 serves to operate the tape transport from the off mode to the transduce mode wherein capstan 37 rotates to withdraw tape from the supply reel and move the tape around the scanning assembly, and wherein the takeup reel rotates in order to take up the tape leaving the capstan. Deenergization of solenoid 123 permits springs 124 and 105 to return the elements to the off mode position.

When it is desired to move the tape from the supply reel to the takeup reel at a much higher speed than the recording or reproducing speed, the function control 80 may be rotated to rotate disc 82 from the position shown in FIGURE 3 to the position shown in FIGURE 4 (fast forward position).. In the fast forward mode of operation, the takeup reel is driven at a relatively high speed, the capstan is not motor driven, and the supply reel is freely rotatable. In the fast forward mode of operation, it is therefore necessary that the takeup reel drive roller 75 be coupled to the takeup reel drive wheel 72 and that the supply reel drive roller 85 remain uncoupled from the supply reel drive wheel 71. A link 125 is pivotally connected by a stud 126 to the disc 82 of the function control and pivotally and slidably connected by stud 127 to the pivotal member 87. The slidable connection is such as to permit link 125 to exert a pull on member 87 for rotating same in a clockwise direction, but to prevent link 125 from exerting any push on member 87 for rotating same in a counterclockwise direction. This means that only the bias of spring 93 will force member 87 against stop 94. Thus, with the function control moved to either the fast forward position or the off position, link 125 permits spring 93 to bias pivotal member 87 against the stop 94. Portion 88 engages stud 89 on pivotal member 83 to hold the same against the bias of spring 87 and maintain supply reel drive 85 disengaged from the drive wheel 71.

During fast forward mode operation, engagement of roller 75 with the takeup reel drive wheel 72 is accomplished by means of a link 131 pivotally connected to the function control at stud 126 and pivotally and slidably connected by means of a stud 133 to pivotal member 101. The slidable connection here is similar in function to the slidable connection of link 125 to member 87 and insures that only the bias of spring 105 will engage member 101 with the stop 103. The downward holding force exerted by link 131 through pin 133 to member 101 holds member 101 against the bias of spring 105 to permit spring 99 to bias roller 75 into engagement with driving wheel 72. Roller 75 drives wheel 72 at the fast forward speed. Although this roller also drives the wheel 72 at the same speed during the transduce mode of operation, the drive wheel 72 is coupled to the remaining part of the takeup reel turntable through a slip clutch (not shown). This expedient, which is well known in the art, allows the take up reel to rotate at the speed required to take up tape from the capstan without slack. That is, although the drive wheel 72 is rotated at a faster speed than required for the transducing mode, the tension in the tape slips the clutch so that the takeup reel moves only fast enough to take up the tape as it is delivered by the capstan.

During the fast forward mode of operation, it is necessary to turn the tape tension servo mechanism shaft 62 in such a direction as to relieve the force exerted by the brake band 64 to resist rotation of the supply reel 11. In order to accomplish this, the tape tension servo brake mechanism is provided with an arm 134 on the shaft 62 for pivoting the shaft in the appropriate direction to relieve brake band tension. The arm 134 carries a stud 136 which is engageable by a portion of a pivotal member 135 mounted on pin 91 and disposed beneath the pivotal member 87. Member 135 is slidably and pivotally secured to one end of a link 137 by a stud 138. As was the case with link 125 and member 87, the slidable connection permits link 137 to exert only a pull on member 135 so that only spring 143 will bias member 135 against the stop 94. The other end of link 137 is secured by a stud 141 to the function control disc 82. With the function control disc in the fast forward position shown in FIGURE 4, the position of stud 141 is such as to cause link 137 to urge pivotal member 135 in a clockwise direction against the bias of a spring 143. This serves to cause portion 140 of member 135 to engage stud 136 and pivot the arm 134 for relieving the tension on servo brake band 64 by pivoting the lever 61 (see FIGURE 2) against the bias of spring 66.

The rewind mode of operation is illustrated in FIGURE 5. For rewind mode operation, the supply reel is driven in a direction of rotation opposite to the direction it rotates in the transduce and fast forward modes. The takeup reel is free to rotate in a reverse direction also as the tape is withdrawn from it. The capstan is not motor driven. In the rewind position, stud 126 is in such a position as to cause link 125 and pivotal member 87 to engage portion 139 of member 87 with stud 136 and maintain the arm 134 in a position such that the tension on the servo brake is relieved. Thus, although link 137 is positioned to allow spring 143 to pivot member 135 to disengage portion 140 from pin 136, the servo brake is still held released. The position of stud 126 is also such as to cause link 125 and pivotal member 87 to permit the bias of spring 86 to hold supply reel roller 85 in engagement with the supply reel drive wheel 71. This drives the supply reel turntable in a direction such as to rewind the tape on the supply reel. During the rewind mode of operation, stud 126 is also in a position such as to operate through link 131 and pivotal members 101 and 97 to insure that the takeup reel drive pulley 75 is disengaged from the takeup reel drive wheel 72. Link 131 is provided with a further stud 145, and a pivotal member 147, pivoted on pin 148 in deck 22, is pivotally and slidably coupled through stud 145 to the link 131. The end of member 147 on the other side of its pivot pin 148 from stud 145 engages one end of the brake pivot member 151. To permit the takeup reel turntable to rotate in the reverse direction during rewind, it is therefore necessary to pivot member 151 clockwise and move brake 155 from engagement with drive wheel 72. When the function control 80 is moved to the rewind position, the position of link 131 will be such as to pivot member 147 against its point of engagement with member 151 to pivot same against spring 153 and thus disengage brake 155 from contact with drive wheel 72.

The control 80 is detent positioned in each of the off mode, fast forward mode and rewind mode positions by the action of links 125, 137 and 131. In the off mode position shown in FIGURE 3, the bias of spring 93 must be overcome in order to rotate the control 80 to rotate disc 82 in the clockwise direction. This is because the bias of spring 93 holds member 87 against stop 94 and clockwise rotation of disc 82 would cause link 125 to pull member 87 against this bias. To rotate disc 82 counterclockwise, the bias of springs 105 and 143 must be overcome. This is because spring 143 biases member 135 against stop 94 and requires that link 137 exert a pulling force against the member 135; and because spring 105 biases member 101 against stop 103 and requires that link 131 exert a pulling force against the member 101. Thus, the bias of the springs is transferred through links 125, 137 and 131 to disc 82 to effectively imprison the disc at a detent position.

In fast forward position, the links 131 and 137 are moved to an over center position (see FIGURE 4) in which they also detent position the disc 82. In fast forward position, links 131 and 137 serve to exert the bias of springs 105 and 143, through the respective members to which the springs are attached, against clockwise rotation of disc 82. Counterclockwise rotation of disc 82 is prevented by a stop (not shown) acting on disc 82 in the position shown in FIGURE 4. This effectively imprisons disc 82 at a detent position.

In the rewind mode of operation, disc 82 is rotated to the position shown in FIGURE 5 wherein link 125 is disposed on the opposite side of the axis of rotation of disc 82 from its position as shown in FIGURE 3. Here, the link 125 functions to present resistance to rotation of disc 82 in a counterclockwise direction and biases disc 82 against a stop (not shown) which prevents further rotation of disc 82 in the clockwise direction. This detent positions the disc 82 as shown in FIGURE 5.

When the function control 80 is in either the rewind or fast forward positions, it is necessary to prevent the apparatus from recording signals on the tape. This prevents destruction or distortion of signals already stored on the tape. It is also desirable to permit the capstan to rotate freely as the tape passes between the supply and takeup reels to prevent it from interfering with the passage of the tape. These functions are accomplished by means of a switch 161 having a plunger 162 engaged by the periphery of disc 82 of the function control 80. This switch is normally closed and is connected in series by leads 176 with the control circuit of solenoid 123. Leads 176 also connect a further switch 171 (the function of which will be explained later) in series with switch 161 and switch 90 across a power supply not shown. With the disc 82 in the fast forward or rewind positions, the plunger of the switch 161 is held in to open the switch and thus prevent energization of solenoid 123. In the off mode position of disc 82 (FIGURE 3), a flat surface 163 formed on disc 82 allows the plunger 162 to move out and close switch 161. Switch 90 may then be closed to actuate solenoid 123.

When the tape guide control 50 is moved to the thread position, operation of the function control 80 to either the fast forward or reverse positions would cause tangling of the tape because the guides would not be positioned for proper guidance. To prevent tangling of the tape when the guides are in the thread position due to inadvertent operation of control 80, a mechanical interlock is provided for preventing rotation of the function control 80 when the guide control 50 is in the thread position. Shaft 52 extends through deck 22 and has a disc 164 keyed thereon. Each of the discs 164 and 82 is provided with a notch 165 and 166 respectively. A rod 167 is slidably mounted on a supporting bracket 168 secured to the deck 22. As may be seen from FIGURE 3, with the guide control disc 164 in the thread position, the periphery of the guide control disc will force the rod 167 to slide into the notch 166 in the function control disc 82. This will prevent the function control disc from turning from the off mode position to either the rewind position or fast forward position.

Even though the function control knob 80 is prevented from turning from the off mode position when the guide control 50 is in the thread position, it is necessary to prevent the transport from being operated to the transduce mode by solenoid 123. Accordingly, a switch 171 is provided in series with the disabling switch 161 on the function control and the control circuit for the solenoid 123. Switch 171 has a plunger 172 engaging the periphery of the guide control disc 164 and is biased outwardly to an open position when the guide control is in the thread position with the flat surface 173 adjacent the plunger. This prevents energization of the solenoid 123. When the guide control disc 164 is moved back to the operative position, plunger 172 is depressed and the switch 171 is closed to permit energization of the solenoid 123.

When the function control 80 is in the fast forward or rewind position, it is similarly necessary to prevent the operation of the guide control to the thread position to avoid danger of severe tape tangling. It may be seen from observing FIGURES 4 and 5, that when the function control disc 82 is in either of the rewind or fast forward positions, rod 167 is forced into the notch 165 in the guide control disc 164 to prevent the guide control disc from turning. Thus by a single mechanical expedient, two interlock functions are performed.

When the guide control is operated from the thread position to the operating position to move the guides close together and close to the periphery of the scanning assembly, it is desirable that either the brake 155 be released from the periphery of takeup reel drive wheel 72 or the tension in brake band 64 be released. This permits a slight back up of the takeup reel or a slight forward rotation of the supply reel and allows some slack in the tape to allow for the longer tape path when the guides are in the closed position (see FIGURE 2). In the transport shown, the brake 155 is released when the guides are in the thread position. In order to accomplish this, a link 181 is pivotally secured to the guide control disc by a stud 183. The other end of link 181 has a bent portion 185 which is engageable with the arm of pivotal member 151 opposite spring 153. Link 181 is held in alignment by a guide 190. When the guide control is moved to the thread position, stud 183 pulls link 181 downwardly to a position wherein member 151 is rotated against spring 153 and the brake 155 is released from the periphery of wheel 72. This release of brake 155 continues during most of the movement of control 50 from the thread position to the operating position. This permits tape to be easily withdrawn from the takeup reel by the motion of the movable guides, thereby eliminating excess tape tension around the drum and heads which tend to hold the movable guides from completely moving to their ready position adjacent to the drum. During the last 20 degrees or so of rotation of the guide control, the link 171 is moved back up to a position wherein member 151 is pulled counterclockwise by spring 153 to bring brake 155 into engagement with the takeup reel drive wheel 72.

If the brake 155 is applied too soon, excess tape tension will develop, restraining the movable guides. If the brake is applied to late, an overabundance of tape will be drawn from the takeup reel, creating too much slack. Thus, the timing of the system is extremely important in order that just the right amount of tape will be withdrawn from the takeup reel as the guides close. To adjust this timing precisely, the link 181 is constructed such that the angle formed by the portion 185 and the rest of the link is adjustable thereby to change the effective length of the link 181. This permits adjustment of the timing to the precise value.

From the foregoing description, it will therefore be seen that the invention provides a tape transport of convenient and easy operation which is simple in its construction and reliable. The use of the particular mechanical arrangement of the linkages shown provides a rugged construction at low cost while maintaining quality. Operation of the device between off, rewind, and fast forward modes is accomplished in a single control which does not require a separate detent mechanism to maintain it in its respective positions due to the application of an over center principle on the linkage mechanism connected to the control. Safety interlock is provided by means of a simple device and threading of the tape and repositioning of the guides to the operating position is greatly facilitated.

The design of the apparatus is such as to not require extremely precise tolerances and center locations. This is because the engaging parts are generally only pulled out of engagement by positive action, and are placed in engagement by an arrangement of springs. The less critical tolerance requirements permit lower cost fabrication assembly and adjustment. Some symmetry of design is present enabling identical parts to be used in certain places, such as the drive wheels 71 and 72, and the belts 33 and 77.

Because of the capstan construction, the device may be switched rapidly from one mode of operation to the next without the necessity for release of pinch rollers and similar devices for holding the tape against the capstan. At high fast forward or rewind speeds, the tape slips over the capstan and does not thereby rotate the capstan at high speed. This is because an air film is developed between the surface of the capstan and the tape. The type of rubber used facilitates such action. The result is less wear on the capstan bearings, permitting the use of lower cost bearings in the capstan than might otherwise be required. Various modifications of the invention will be apparent to those skilled in the art from the foregoing description and accompanying drawings and such modifications are intended to fall with the scope of the appended claims.

What is claimed is:

1. In a tape transport having a rotatable supply reel support and a rotatable takeup reel support and a rotatable capstan which is in driving relation with the tape, a drive system for selectively operating the tape transport in an off mode, a transduce mode, a fast forward mode and a rewind mode, said drive system including in combination, a first motor for rotating the supply reel and takeup reel supports, first drive means operable between first and second positions to couple and uncouple, respectively, said first motor and the supply reel support, second drive means operable between first and second positions to couple and uncouple, respectively, said first motor and the takeup reel support, a first control connected to said first and second drive means and selectively operable to off mode, fast forward mode and rewind mode positions, said first control operating in the off mode position to position each of said first and second drive means in the second position thereof, said first control operating in the fast forward mode position to position said first drive means in the second position thereof and to position said second drive means in the first position thereof, said first control operating in the rewind mode position to position said first drive means in the first position thereof and to position said second drive means in the second position thereof, a second motor for rotating the capstan, third drive means operable between first and second positions to couple and uncouple, respectively, said second motor and the capstan, said capstan being freely rotatable when said thread drive is in its second position, a second control connected to said third drive means and operable between an off mode position wherein said third drive means is in the second position thereof to a transduce mode position wherein said third drive means is in the first position thereof, said second control operating in the transduce mode position to operate said second drive means to the first position thereof irrespective of the effect of said first control, and means for preventing the operation of said second control in said transduce mode position when said first control is in either of the fast forward mode and the rewind mode positions.

2. In a tape transport having a rotatable supply reel support and a rotatable takeup reel support and a rotatable capstan which is in driving relation with the tape, a drive system for selectively operating the tape transport in an off mode, a transduce mode, a fast forward mode and a rewind mode, said drive system including in combination, a first motor for rotating the supply reel and takeup reel supports, first drive means operable between first and second positions to couple and uncouple, respectively, said first motor and the supply reel support, second drive means operable between first and second positions to couple and uncouple, respectively, said first motor and the takeup reel support, a first control connected to said first and second drive means and selectively operable to off mode, fast forward mode and rewind mode positions, said first control operating in the off mode position to position each of said first and second drive means in the second position thereof, said first control operating in the fast forward mode position to position said first drive means in the second position thereof and to position said second drive means in the first position thereof, said first control operating in the rewind mode position to position said first drive means in the first position thereof and to position said second drive means in the second position thereof, a second motor for rotating the capstan, third drive means operable between first and second positions to couple and uncouple, respectively, said second motor and the capstan, said capstan being freely rotatable when said thread drive is in its second position, a second control connected to said third drive means and operable between an off mode position wherein said third drive means is in the second position thereof to a transduce mode position wherein said third drive means is in the first position thereof, said second control operating in the transduce mode position to operate said second drive means to the first position thereof irrespective of the effect of said first control, means for preventing the operation of said second control in said transduce mode position when said first control is in fast forward mode and rewind mode positions, a first brake operable between a first position engaging the takeup reel support for preventing rotation thereof opposite to the direction in which the takeup reel support is rotated by said second drive means and a second position substantially disengaging the takeup reel support, said first control operating in the rewind mode position to operate said first brake to the second position thereof, and a second brake operable between a first position engaging the supply reel support to maintain tape tension and a second position substantially disengaging the supply reel support, said first control operating in the fast forward mode and rewind mode positions thereof to operate said second brake to the second position thereof.

3. In a tape transport having a rotatable supply reel support and a rotatable takeup reel support, a drive system for selectively operating the tape transport in an off mode, a transduce mode, a fast forward mode and a rewind mode, said drive system including in combination a first motor for rotating the supply and takeup reel supports, first drive means operable between first and second positions to couple and uncouple, respectively, said first motor and the supply reel support, second drive means operable between first and second positions to couple and uncouple, respectively, said first motor and the takeup reel support, a first control connected to said first and second drive means and selectively operable to off mode, fast forward mode and rewind mode positions, said first control operating in the off mode position to position each of said first and second drive means in the second position thereof, said first control operating in the fast forward mode position to position said first drive means in the second position thereof and to position said second drive means in the first position thereof, said first control operating in the rewind mode position to position said first drive means in the first position thereof and to position said second drive means in the second position thereof, said first and second drive means operating to drive the tape between a supply reel on the supply reel support and a takeup reel on the takeup reel support at relatively high speed, a capstan having a tape engaging portion which is in driving relation with the tape, a second control operable between a transduce mode position and an off position, means for allowing operation of said second control to said transduce mode position only when said first control is in the off mode position, third drive means responsive to operation of said second control to the transduce mode position for driving said capstan, said third drive means permitting free rotation of said capstan in the off position, said tape engaging portion of said capstan in the transduce mode effecting a driving contact with the tape as it passes between the supply reel on the supply reel support and the takeup reel on the takeup reel support to drive the tape at a relative low speed, said tape engaging portion having an outer surface composed of neoprene rubber of a hardness of the order of 70 durometer to permit tape to slip thereover with respect to the outer surface of said tape engaging portion of said capstan at relatively high tape speeds with said second control in the off position and thereby permit said first control to switch between its respective mode positions without the necessity for removing said tape engaging portion of said capstan from engagement with said tape.

4. The combination of claim 3 wherein said tape engaging portion of said capstan comprises a metal supporting shaft, a metal sleeve secured on said shaft, and a relatively thin coating of neoprene rubber on the outer surface of said sleeve.

5. In a tape transport having a deck which supports a rotatable supply reel support and a rotatable takeup reel support, a drive system for selectively operating the tape transport in an off mode, a fast forward mode and a rewind mode, said drive system including a combination, a drive motor, a supply reel drive roller coupled to said drive motor to be rotated thereby, a control member rotatably mounted on the deck and selectively rotatable to an off mode position, a fast forward mode position, and a rewind mode position, brake means for inhibiting rotation of the supply reel support to maintain a predetermined tension on the tape, first linkage means coupling said control member to said supply reel drive roller and including a first spring loaded link having a first end pivotally connected to said control member, second linkage means coupling said control member to said brake means and including a second spring loaded link having a first end connected to said control member, said first linkage means being responsive to rotation of said control member to said fast forward position to position said supply reel drive roller disengaged from the supply reel support and further being responsive to rotation of said control member to the rewind mode position to position said supply reel drive roller engaged with said supply reel support, said second linkage means being responsive to rotation of said control member to the fast forward position and the rewind position to substantially reduce the inhibiting affect of said brake means on the supply reel support, said first ends of said first and second spring loaded links each imparting forces to said control member for detent positioning said control member in the off mode position, the fast forward mode position or the rewind mode position.

6. In a tape transport having a deck with supports a rotatable supply reel support and a rotatable takeup reel support, a drive system for selectively operating the tape transport in an off mode, a fast forward mode and a rewind mode, said drive system including in combination, a drive motor, a supply reel drive roller and a takeup reel drive roller each coupled to said first drive motor to be rotated thereby, a control member rotatably mounted on the deck and rotatable to an off mode position, a fast forward mode position, and a rewind mode position, a tape tension servo brake for inhibiting the rotation of the supply reel support to maintain a predetermined tension on the tape, a first mechanical linkage coupling said control member to said supply reel drive roller and including a first link having a first end pivotally secured to said control member at a first point displaced from the axis of rotation thereof, a second mechanical linkage coupling said control member to said takeup reel drive roller and including a second link having a first and pivotally secured to said control member at a second point displaced from the axis of rotation thereof, a third mechanical linkage coupling said control member to said tape tension servo brake and including a third link having a first end pivotally connected to said control member at said first point, said first, second and third mechanical linkages operating, respectively, in response to operation of said control member to its various positions to engage said supply reel drive roller with the supply reel support, to engage said takeup reel drive roller with the takeup reel support, and to release the tape tension servo brake, said first, second and third linkages including resilient means providing a force bias at each of said first and second points on said control member, said force bias at said first and second points producing respective first and second moments on said control member about the axis of rotation thereof, said first and second moments being additive in a given direction, in a direction opposite the given direction, and in opposing directions according to the respective positions of said control member to provide over center positioning thereof.

7. In a tape transport having a rotatable takeup reel support, a drive system for operating the tape transport including in combination, a drive motor, a takeup reel drive roller coupled to said drive motor to be rotated thereby, a first control connected to said takeup reel drive roller and selectively operable to engage and disengage said takeup reel drive roller and the takeup reel support, brake means coupled to said first control and operable thereby to engage the takeup reel support and resist rotation of the takeup reel support in a given direction, a scanning assembly including transducing means for recording signals on or reproducing signals from magnetic tape, a plurality of guides for directing the tape in a path about said scanning assembly, support means for supporting said guides, said support means being movable between an operating position wherein said guides are disposed proximate each other and said scanning assembly to a thread position wherein said guides are moved away from each other and said scanning assembly to facilitate threading of tape on said guides and scanning assembly, a second control connected to said support means and operable between operating and thread positions for moving said support means between the operating and thread positions, and a link coupling said second control to said brake means and substantially disengaging same from the takeup reel support as said second control is operated from thread to operating positions to permit rotation of the takeup reel means in said given direction as said support means are moved to operating position, whereby slack is provided in the tape to prevent resistance by the tape to movement of said guides.

8. In a tape transport having a rotatable supply reel support and a rotatable takeup reel support, a drive system for selectively operating the tape transport in an off mode, a fast forward mode and a rewind mode, said drive system including in combination, a motor for rotating the supply and takeup reel supports, first drive means operable between first and second positions to couple and uncouple, respectively, said motor and the supply reel support, second drive means operable between first and second positions to couple and uncouple, respectively, said first motor and the takeup reel support, a first control connected to said first and second drive means and selectively operable to off mode, fast forward mode and rewind mode positions, said first control operating in the off mode position to position each of said first and second drive means in the second positions thereof, said first control operating in the fast forward mode position to position said first drive means in the second position thereof and to position said second drive means in the first position thereof, said control means operating in rewind mode position to position said first drive means in the first position thereof and to position said second drive means in the second position thereof, a plurality of movable guides for directing the tape in a predetermined path between a supply reel on the supply reel support and a takeup reel on the takeup reel support, a second control coupled to said movable guides for moving the same between an operating position and a thread position wherein threading of tape on said guides is facilitated, locking means engageable with said second control in fast forward mode and rewind mode positions of said first control to prevent operation of said second control from the operating position to the thread position, said locking means being engageable with said first control in the thread position of said second control to prevent operation of said first control from off mode position to fast forward mode and reverse mode positions.

9. In a tape transport having a rotatable supply reel support, a rotatable takeup reel support and a rotatable capstan, a drive system for selectively operating the tape transport in an off mode, a transduce mode, a fast forward mode and a rewind mode, said drive system including in combination, a first motor for rotating the supply reel and takeup reel supports, first drive means operable between first and second positions to couple and uncouple, respectively, said first motor and the supply reel support, second drive means operable between first and second positions to couple and uncouple, respectively, said first motor and the takeup reel support, a first control connected to said first and second drive means and selectively operable to off mode, fast forward mode and rewind mode positions, said first control operating in the off mode position to position each of said first and second drive means in the second position thereof, said first control operating in the fast forward mode position to position said first drive means in the second position thereof and to position said second drive means in the first position thereof, said first control operating in the reverse mode position to position said first drive means in the first position thereof and to position said second drive means in the second position thereof, a second motor for rotating the capstan, third drive means operable between first and second positions to couple and uncouple, respectively, said second motor and the capstan, a second control connected to said third drive means and operable between an off mode position wherein said third drive means is in the second position thereof to a transduce mode position wherein said third drive means is in the first position thereof, said second control operating in the transduce mode position to operate said second drive means to the first position thereof irrespective of the effect of said first control, and means for preventing the operation of said second control when said first control is in fast forward mode and rewind mode positions, a plurality of guides for directing the tape in a predetermined path between a supply reel on the supply reel support and a takeup reel on the takeup reel support, a third control coupled to said guides for moving said guides between an operating position and a thread position wherein threading of tape on said guides is facilitated, first switch means operable by said third control in thread position to disable said second control, and second switch means operable by said first control in fast forward mode and rewind mode positions to disable said second control.

10. In a tape transport having a deck which supports a rotatable supply reel support and a rotatable takeup reel support, a drive system for selectively operating the tape transport in an off mode, a fast forward mode and a rewind mode, said drive system including in combination, a drive motor, a first support member pivotally mounted to the deck, a supply reel drive roller mounted on said first support member and coupled to said drive motor to be rotated thereby, a first spring connected to said first support member and biasing said supply reel drive roller toward engaging said supply reel support for driving same, a second support member pivotally mounted to the deck, a takeup reel drive roller mounted on said second support member and coupled to said drive motor to be rotated thereby, a second spring connected to said second support member and biasing said takeup reel drive roller toward engaging the takeup reel support for driving same, a control member rotatably mounted on the deck and selectively rotatable to an off mode position, a fast forward mode position, and a rewind mode position, first linkage means having a first portion for engaging said first support member and having a second portion pivotally connected to said control member, second linkage means having a third portion for engaging said second support member and having a fourth portion pivotally connected to said control member, said control member operating as it is rotated from the off mode position to the fast forward mode position to exert a force on said second linkage means to engage said third portion thereof with said second support member and move same against the bias of said second spring and disengage said takeup reel drive roller from the takeup reel support, said control member operating as it is rotated from the off mode position to the rewind mode position to exert a force on said first linkage means to engage said first portion thereof with said first support member and move same against the bias of said first spring to disengage said supply reel drive roller from the supply reel support, whereby said supply reel and takeup reel drive rollers are held in engagement with their respective reel supports only by spring action.

11. In a tape transport having a rotatable takeup reel support and a rotatable supply reel support, a drive system for operating the tape transport including in combination, takeup reel support means and supply reel support means, a scanning assembly including transducing means for recording signals on or reproducing signals from magnetic tape, means for driving the tape between said supply reel support means and said takeup reel support means and over said scanning assembly, first and second brake means operable to engage the supply reel support and the takeup reel support respectively, said first and second brake means operating to maintain tension in the tape, a plurality of guides for directing the tape in a predetermined path about said scanning assembly, a guide support for supporting said guides, said guide support being movable between an operating position wherein said guides are disposed proximate each other and said scanning assembly to a thread position wherein said guides are moved away from each other and said scanning assembly to facilitate threading tape through said guides and over said scanning assembly, a control connected to said guide support and operable between operating and thread positions for moving said guide support between the operating and thread positions, and a link coupling said control to one of said first and second brake means and substantially disengaging same from its respective reel support as said control is operated from thread to operating positions to provide slack in the tape for preventing resistance thereby to movement of said guides.

References Cited

UNITED STATES PATENTS

| | | | |
|---|---|---|---|
| 2,675,973 | 4/1954 | Reed et al. | 242—55.12 |
| 3,141,626 | 7/1964 | Hoskin | 242—55.12 |

LEONARD D. CHRISTIAN, *Primary Examiner.*